L. TOPF.
GERMINATING APPARATUS.
APPLICATION FILED JAN. 25, 1913.

1,090,431.

Patented Mar. 17, 1914.

Witnesses:
Ralph C. Busser
Alfred Hoffmann

Inventor:
Ludwig Topf

UNITED STATES PATENT OFFICE.

LUDWIG TOPF, OF ERFURT, GERMANY.

GERMINATING APPARATUS.

1,090,431.  Specification of Letters Patent.  Patented Mar. 17, 1914.

Application filed January 25, 1913. Serial No. 744,153.

*To all whom it may concern:*

Be it known that I, LUDWIG TOPF, a subject of the German Emperor, residing at Erfurt, Germany, have invented certain new and useful Improvements in Germinating Apparatus, of which the following is a specification.

This invention relates to a germinating apparatus, and pertains particularly to a malting or germinating box or chest in which the material to be germinated is treated, the air supply being cut off at intervals.

In the box or chest according to the present invention all of the inlet and outlet devices for the introduction of fresh air with which the chest is supplied at intervals are so arranged that they lie above the space in which the strata of air rich in carbonic acid gas gradually collects in the closed box. In this manner loss of carbonic acid during the operation is avoided as far as possible. Furthermore, the supply conduit for the external air is combined with a device whereby, when the box is closed, a circulation of the air rich in carbonic acid gas through the malt is obtained, the temperature of the air being at the same time suitably regulated. Due to these characteristic features of the invention, an intense and uniform re-aeration of the malt is obtained and on the other hand, a uniform collection of the carbonic acid in the product is effected.

Figure 1:
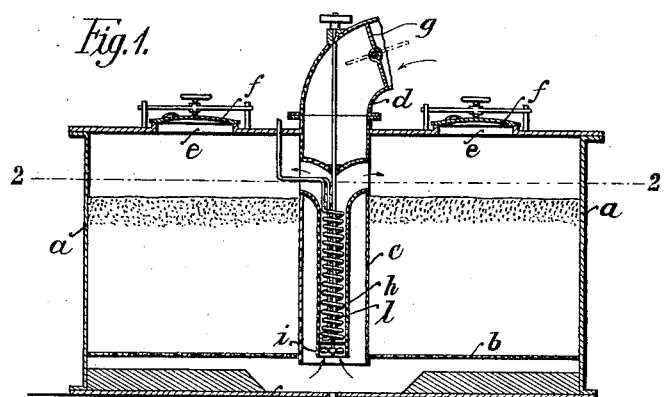
Figure 2:
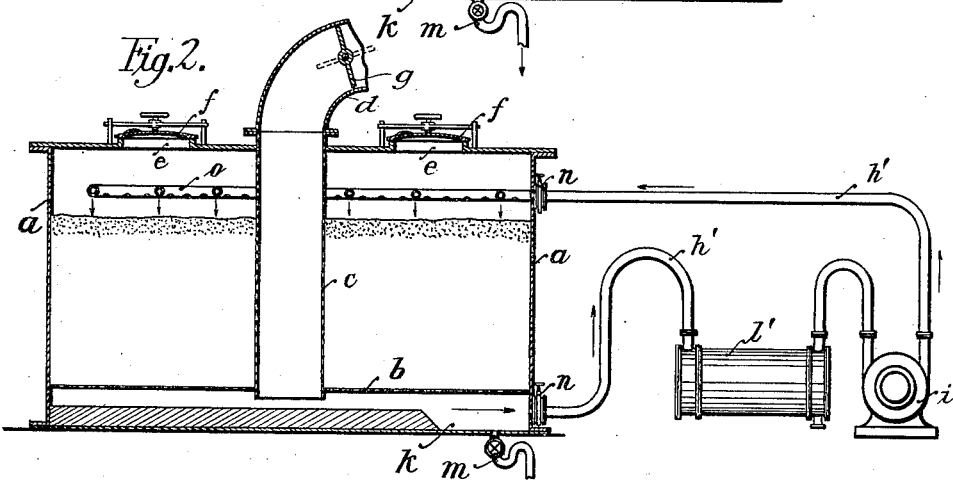
Figure 3:
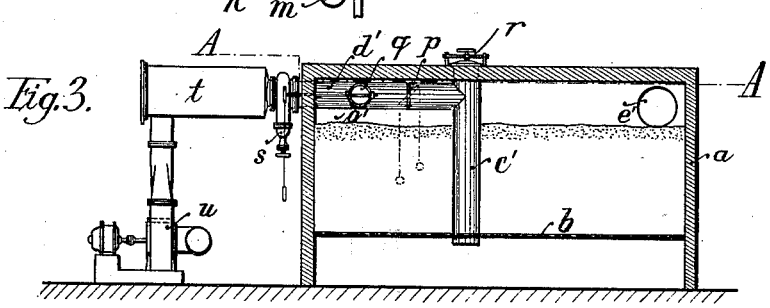
Figure 4:
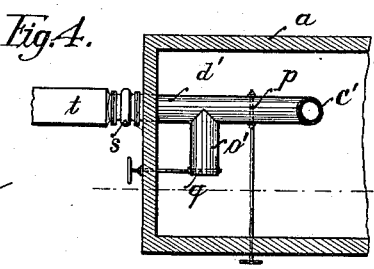

In the drawings which form a part of the present specification, Figure 1 shows a diagrammatic view of one form of the apparatus, in vertical section, Fig. 2 is a vertical section of a second form of the apparatus, Fig. 3 is a similar view of a third form, and Fig. 4 is a view on line A—A of Fig. 4.

Referring more particularly to said drawings, in Fig. 1, $a$ indicates a box or chest which may have any desired or suitable form in section; as, for instance, round, oval or angular. Said box $a$ is provided with a perforate partition or false bottom $b$ upon which the material to be malted or germinated is heaped to any desirable depth, the bottom $b$ being spaced from the bottom of the chest $a$ to form an air or gas chamber below the layer or mass of malt. Mounted in the box in suitable position and arranged, for instance, centrally in the box, are one or more conduits $c$, which project downwardly through said box and through the partition or bottom $b$ into the air or gas chamber below said partition. The upper ends of said pipes or conduits $c$ are connected by means of conduits $d$ with a blower, (not shown,) for the purpose of supplying fresh air to the chest. In the drawings only one pipe $c$ is shown for the sake of clearness. The top of the chest is also provided with a series of covered outlet openings $e$ for the air, which may be of any suitable or desired form, size, number and arrangement. Since these openings lie well above the surface of the layers of germinating material, and the air supply pipe can be closed by a valve $g$, which also is located at a great height, (determined by its distance from the lower edge of the pipe $c$), above the material, it is evident that all the inlet and outlet openings for the outside air lie well above the air rich in carbonic acid gas which forms in the mass of malt and descends. In this way the loss of carbonic acid gas can be reduced to a minimum, even when the cut-off for the fresh air is not absolutely gas-tight. This arrangement also causes the fresh air which is supplied at intervals, to first pass below the malt and then rise upwardly through the mass, distributing itself therethrough before finally passing out of the outlets $e$. In this manner, an intense and uniform aeration of the malt is effected and the carbonic acid gas is rapidly removed. The aeration can also be effected in the reverse direction.

In the central air-pipe $c$ is disposed a second pipe $h$, whose lower end is placed near the lower end of the pipe $c$, while its upper end is branched into a plurality of outlets which enter the chamber above the malt body through the sides of the pipe $c$. In the lower part of the pipe $h$ is mounted a small blower or fan $i$, which is externally driven, and which, when the box is closed, continually draws the carbonic acid gas which has collected in the malt mass down through the mass to the lower gas chamber and up through the pipe $h$, as indicated by the arrows in Fig. 1, the gas being again distributed over the malt and again passing down through the latter. In this manner, by means of the pipe $h$ and blower $i$, a constant circulation of the air rich in carbonic acid gas can be maintained through the material to be germinated and thereby a uniform collection and distribution of the gas in the material is effected.

In order to aid the positive action of the blower $i$ a sub-chamber or collecting-compartment $k$ can be provided in which the carbonic acid gas which has descended through the malt mass can be collected, so that the blower $i$ draws in for circulation all of the accumulated gas for further distribution through the material which is being germinated. If necessary, more than one of the pipes $h$ can be provided to carry on the desired circulation of gas. Furthermore, one or more fans $i$ may be employed, if necessary.

During the circulation of the air rich in carbonic acid gas through the pipe $h$, the air can be simultaneously dried and regulated as to temperature in the following manner:—A surface condenser $l$, as shown in Fig. 1, is mounted in the circulating pipe $h$, so that the air drawn through the pipe $h$, by the blower $i$ must pass over said condenser. The resulting water of condensation can be disposed of in any suitable manner, for instance, by means of a siphon $m$ leading from the bottom of the gas chamber $k$.

The devices for carrying out the circulation of the air rich in carbonic acid gas and the proper regulation of the temperature and condensation of the same can be carried on outside of the germinating chest. An arrangement of this character is shown in Fig. 2. In this construction, the circulating apparatus $h'$ is not located in the pipe $c$, but is connected to the box by suitable devices so as to enter the sides thereof above and below the layers or mass of malt. In this construction, the condenser $l'$ is also mounted outside the chest $a$ in any suitable manner. The gas-chamber $k$ is placed directly in front of the lower connection of the pipe $h'$ with the box or chest $a$. The pipes $h'$ can be closed by means of valves $n$.

The outlet portion of the pipe $h$ which is shown as opening out upon the top of the malt mass in Fig. 1 can be constructed, if desired, in the grid form $o$, as shown in Fig. 2, so that when the air rich in carbonic acid gas is forced therefrom, it will be distributed evenly over the top of the mass.

In operation, the air rich in carbonic acid gas which is confined in the closed box or chest is drawn at intervals through the blower $i'$, and over the condenser $l'$, where it is appropriately dried and brought to a suitable temperature, and then again blown into the chest $a$ over the malt, whence it once more descends through the layers thereof.

If the circulation above stated is not desired, the box is cut off from the circulating apparatus by means of the valves $n$. The circulating apparatus can also be so arranged that the condenser can be switched out of the circulating apparatus during the circulation of the air, if it is so desired. The circulating apparatus in connection with the blower $i'$ can be used with or without the condenser $l'$ supplying the chest at intervals with fresh air.

In the form shown in Figs. 3 and 4, the apparatus is so arranged that the air can be blown either from above down upon and through the material to be germinated, or from below up through the material by means of a single fan or blower without reversing the latter, and that all the air circulating devices can be cut off from the blower by means of a single cut-off device. In this construction, the pipe $c'$ has its lower end opening below the bottom $b$, while its other end projects through the top of the box or chest or through one side of the box into the outer atmosphere. This outer end can be closed by a device $r$.

From pipe $c'$ a member $d'$ branches off and extends to the blower $u$ and is further provided with a branch pipe $o'$ which opens into the interior of the box $a$ above the material to be germinated. The pipes $c'$, $d'$, $o'$ can be cut off from the blower $u$ by means of a single gas-tight valve $s$ which is inserted in the pipe $d'$. In the pipes $d'$, $o'$ are also provided cut-off devices $p$, $q$, which are arranged to be operated from the outside of the box $a$ and which may be throttle valves. If the valve $p$, in the pipe $d'$ is opened, and the valve $q$ in pipe $o'$ is closed, then the blower $u$ can blow air through the pipes $d'$, $c'$ under the material to be germinated, from where, after being forced through the material from below upwardly, it can pass out of the opening $e'$. If the valve $p$ and opening $e'$ are then closed, and the valve $q$ is opened the air will pass out of the pipe $d'$ through the pipe $o'$ above the material, is forced through the latter from above downwardly, and issues thence through the opening governed by the closure $r$, which in this case has been removed. In each case the air will be forced through the material to be germinated. The air can naturally be drawn through the material by the same apparatus instead of being forced therethrough. Between the chest and the blower a suitable apparatus for regulating the temperature of the ventilating air, or for drying or moistening it can be inserted.

What I claim as my invention is:

1. A germinating apparatus, comprising in combination, a box forming a germinating compartment, and having outlet openings in its top, a partition extending across the compartment to hold the material to be germinated and forming upper and lower chambers, said partition permitting passage of air therethrough, a conduit for introducing fresh air into said compartment extending vertically therethrough and having its lower end opening below said partition, means for closing said outlet openings, means for cutting off the passage of fresh air through said conduit, and means for drawing the carbonic acid gas laden air from the lower chamber and distributing it upon the upper surface of the material in the upper chamber when said means for cutting off the passage of fresh air is closed.

2. A germinating apparatus, comprising in combination, a box forming a germinating compartment and having outlet openings in its top, a partition extending across the compartment to hold the material to be germinated and forming upper and lower chambers, said partition permitting passage of air therethrough, a conduit for introducing fresh air into said compartment extending vertically therethrough and having its lower end opening below said partition, means for closing said outlet openings, means for cutting off the passage of fresh air through said conduit, a gas collecting chamber formed in communication with said lower chamber and means for drawing the gas laden air through said collecting chamber and passing it into said upper chamber above the mass of material therein.

3. A germinating apparatus, comprising in combination, a box forming a germinating compartment, a perforate partition extending across said box to form upper and lower chambers and adapted to carry the germinating material, air outlet ports located in the top of said box, means for closing said outlet ports, a fresh air supply conduit extending vertically through the top of said box and having its lower end extending below said perforate partition, means for cutting off the air supply in said conduit, and means located in said conduit for drawing the gas laden air from below said perforate partition and distributing it over the mass of the material when said means for cutting off the air supply in said conduit is closed.

4. A germinating apparatus, comprising in combination, a box forming a germinating compartment, and having outlet openings in its top, a partition extending across the compartment to hold the material to be germinated and forming upper and lower chambers, said partition permitting passage of air therethrough, a conduit for introducing fresh air into said compartment extending vertically therethrough and having its lower end opening below said partition, means for closing said outlet openings, means for cutting off the passage of fresh air through said conduit, means for drawing the carbonic acid laden air from the lower chamber and distributing it upon the upper surface of the material in the upper chamber when said means for cutting off the passage of fresh air is closed, and means for regulating the temperature and condensation of the gas laden air during its circulation.

5. A germinating apparatus, comprising in combination, a box forming a germinating compartment and having outlet openings in its top, a partition extending across the compartment to hold the material to be germinated and forming upper and lower chambers, said partition permitting passage of air therethrough, a conduit for introducing fresh air into said compartment extending vertically therethrough and having its lower end opening below said partition, means for closing said outlet openings, means for cutting off the passage of fresh air through said conduit, a gas collecting chamber formed in communication with said lower chamber, means for drawing the gas laden air through said collecting chamber and passing it into said upper chamber above the mass of material therein, and a means for regulating the temperature and condensation of the gas laden air during its circulation.

6. A germinating apparatus, comprising in combination, a box forming a germinating compartment, a perforate partition extending across said box to form upper and lower chambers and adapted to carry the germinating material, air outlet ports located in the top of said box, means for closing said outlet ports, a fresh air supply conduit extending vertically through the top of said box and having its lower end extending below said perforate partition, means for cutting off the air supply in said conduit, means located in said conduit for drawing the gas laden air from below said perforate partition and distributing it over the mass of the material when said means for cutting off the air supply in said conduit is closed, and means for regulating the temperature and condensation of the gas laden air during its circulation.

7. A germinating apparatus, comprising in combination, a box forming a germinating compartment, a perforate partition extending across said box to form upper and lower chambers and adapted to carry the germinating material, air outlet ports located in the top of said box, means for closing said outlet ports, a fresh air supply conduit extending vertically through the top of said box and having its lower end extending below said perforate partition, means for cutting off the air supply in said conduit, means located in said conduit for drawing the gas laden air from below said perforate partition and distributing it over the mass of the material when said means for cutting off the air supply in said conduit is closed, and means also located in said conduit for regulating the temperature and condensation of the gas laden air during its circulation.

In testimony whereof I have affixed my signature in presence of two witnesses.

LUDWIG TOPF.

Witnesses:
  ALFRED HOFFMANN,
  BERTICE B. BUSSER.